to guide a shielding cap mounting arrangement for electric outlet.

(12) United States Patent
Wang

(10) Patent No.: US 6,596,940 B2
(45) Date of Patent: Jul. 22, 2003

(54) SHIELDING CAP MOUNTING ARRANGEMENT FOR ELECTRIC OUTLET

(76) Inventor: Ming-Shan Wang, No. 16, Alley 25, Lane 127, Lin Sen Road, Kweishan Hsiang, Taoyuan Hsien (TW)

( * ) Notice: Subject to any disclaimer, the term of this patent is extended or adjusted under 35 U.S.C. 154(b) by 0 days.

(21) Appl. No.: 10/020,877

(22) Filed: Dec. 19, 2001

(65) Prior Publication Data

US 2003/0111250 A1 Jun. 19, 2003

(51) Int. Cl.[7] .................................................. H02G 3/00
(52) U.S. Cl. ........................... 174/67; 439/145; 439/652
(58) Field of Search ...................... 174/66, 67; 439/145, 439/652, 491, 139, 136, 134, 135, 138, 140, 149; 220/241, 242

(56) References Cited

U.S. PATENT DOCUMENTS

| | | | |
|---|---|---|---|
| 5,267,870 A | * 12/1993 | Maresh | 439/139 |
| 5,989,052 A | * 11/1999 | Fields et al. | 439/373 |
| 6,283,787 B1 | * 9/2001 | Chou | 439/488 |
| 6,406,308 B1 | * 6/2002 | Wang | 439/145 |

* cited by examiner

Primary Examiner—Dean A. Reichard
Assistant Examiner—Jinhee J Lee
(74) Attorney, Agent, or Firm—Rosenberg, Klein & Lee

(57) ABSTRACT

A shielding cap mounting arrangement includes an electric outlet, the electric outlet having a shell, a top recess in the shell, a set of plugholes in the top recess for receiving an electric plug, two rails at two sides of the top recess, two parallel sliding grooves respectively defined in the rails at two sides of the top recess, and two downward protruding portions downwardly protruded from the rails on the middle at an outer side, and a shielding cap mounted in the top recess between the downward protruding portions and moved along the sliding grooves to close/open the plugholes, the shielding cap having two side wings respectively horizontally inserted into the sliding grooves and suspended below the downward protruding portions to guide movement of the shielding cap in the top recess and to prohibit the shielding cap from escaping out of the top recess.

2 Claims, 18 Drawing Sheets

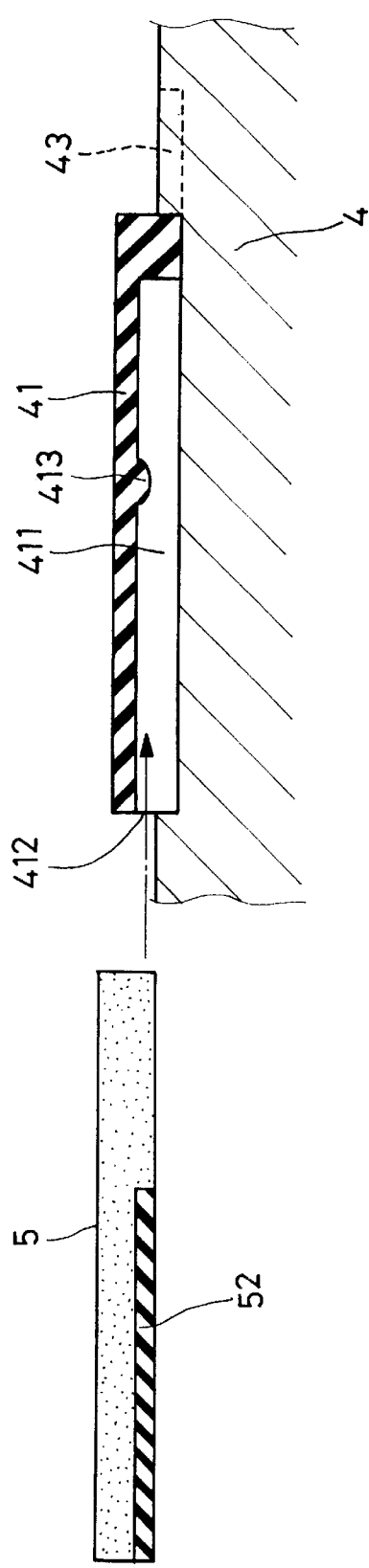
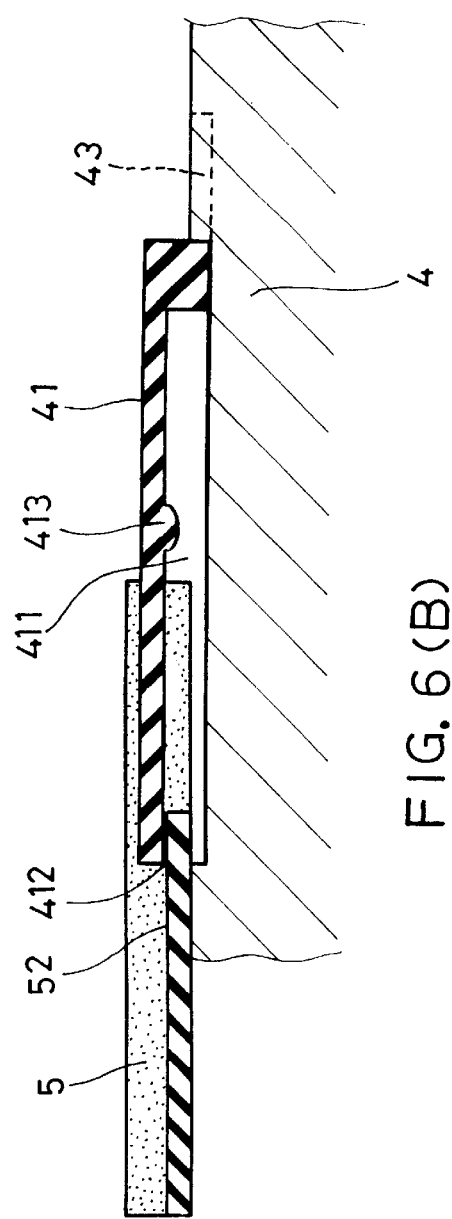
FIG. 6 (A)
FIG. 6 (B)

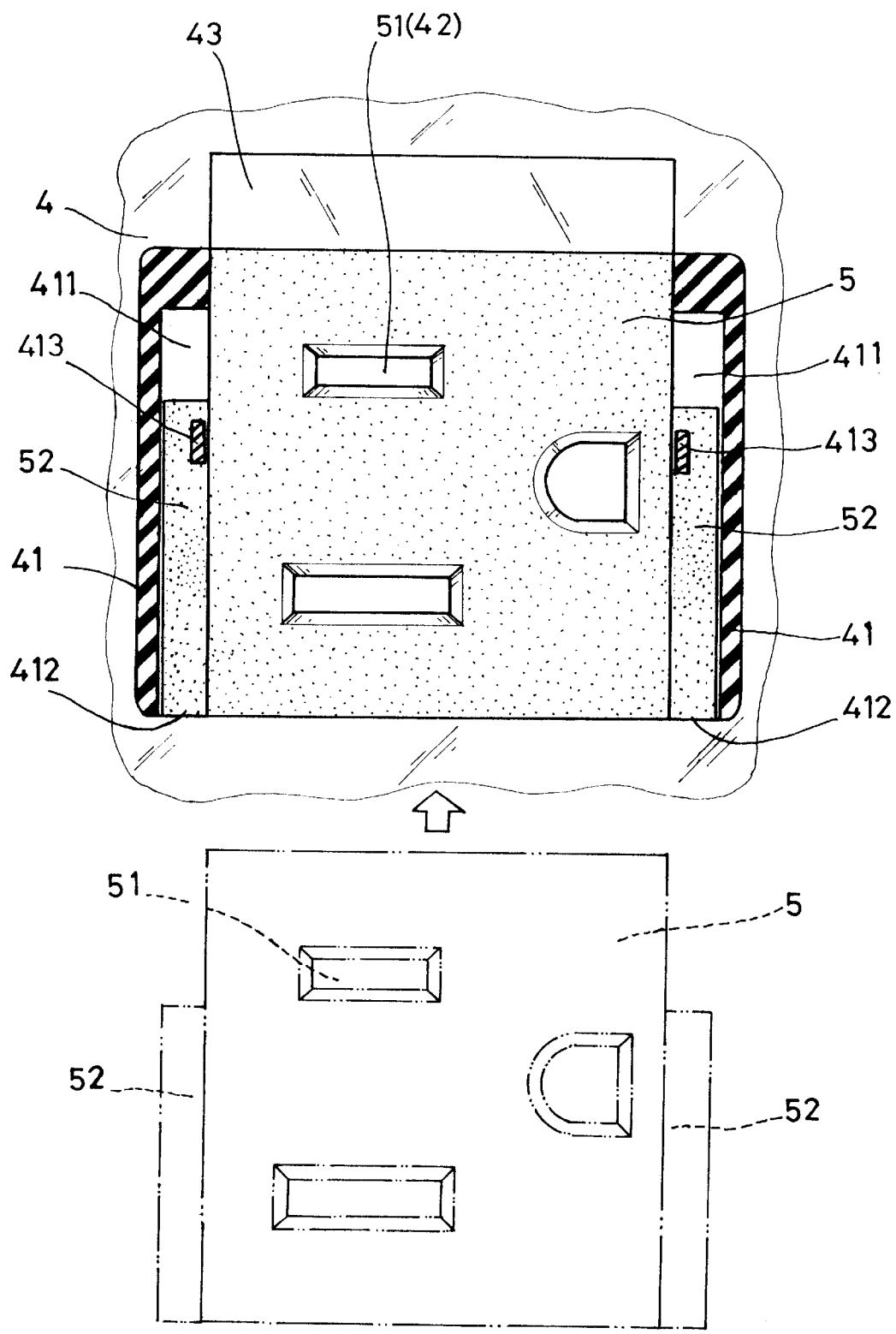
F I G. 10

SHIELDING CAP MOUNTING ARRANGEMENT FOR ELECTRIC OUTLET

BACKGROUND OF THE INVENTION

1. Field of the Invention

The present invention relates to electric outlets and, more specifically, to a shielding cap mounting arrangement for electric outlet, which enables the shielding cap to be moved horizontally to close/open the plugholes.

2. Description of the Related Art

FIG. 1 illustrates a conventional electric extension cable in which a shielding cap 12 is used and fastened to the vacant socket 1 to keep the respective plugholes 11 from sight, preventing insertion of external objects into the plugholes 11 by a child. The shielding cap 12 has bottom rods corresponding to the plugholes 11 for installation. When in use, the user must remove the corresponding shielding cap 12 from the socket 1 so that the electric plug can be inserted into the socket 1. After removable of the shielding cap 12 from one socket 1 of electric outlet, the shielding cap 12 must be properly received. Because the shielding cap 12 is a small item, it tends to be lost somewhere after removal from the corresponding socket 1 of the electric outlet. Further, it is inconvenient to mount and dismount the shielding cap 12 frequently.

In order to eliminate the aforesaid drawbacks, various safety electric outlets have been disclosed. These safety electric outlets have a safety structure on the inside, which prevents direct contact of inserted external object(s) with the internal electric contacts. When using these electric outlets, a supplementary device, for example, a push rod, plug pin, spring, etc., is used with the inserted electric plug to open the passage between the plugholes and the corresponding electric contacts in the electric socket, enabling the metal blades of the electric plug to be set into contact with the respective electric contacts in the socket to close the circuit. However, providing a safety structure in an electric socket must change the positioning or structure of the original electric contacts in the electric socket. Further, the installation of the safety structure complicates the fabrication of the electric socket and, may increase the dimensions of the electric socket.

FIGS. 2A~2C illustrates the use of a shielding cap 23 in an electric outlet 2 to close/open the plugholes of an electric socket 21. As illustrated, each electric socket 21 of the electric outlet 2 has a top recess 22 and two sliding grooves 221 horizontally disposed in the top recess 22 at two sides. The shielding cap 23 is inserted into the top recess 22, having two protruded coupling portions 231 respectively coupled to the sliding grooves 221. After installation in the top recess 22 of the electric socket 21, the shielding cap 23 can be moved horizontally along the sliding grooves 221 back and forth to close/open the plugholes in the top recess 22. This design still has drawbacks. In order to let the shielding cap 23 be easily coupled to the top recess 22, the length of the protruded coupling portions 231 is limited. However, the protruded coupling portions 231 tend to be forced out of the sliding grooves 221 when operating the shielding cap 23.

FIGS. 3A~3C show still another design of electric outlet and shielding cap arrangement according to the prior art. According to this design, each electric socket 31 of the electric outlet 2 has a top recess 32 and two sliding grooves 321 in the top recess 32; the shielding cap 33 has two bottom hooks 331 respectively hooked in the sliding grooves 321. After installation, the shielding cap 33 can be moved horizontally in the top recess 32 between two positions to close/open the plugholes in the top recess 32. This design is still not satisfactory in function. When moving the shielding cap 33, the bottom hooks 331 tend to be deformed or damaged, thereby causing the shielding cap 33 to be forced out of the top recess 32.

SUMMARY OF THE INVENTION

The present invention has been accomplished to provide a shielding cap mounting arrangement for electric outlet, which eliminates the aforesaid problems. It is one object of the present invention to provide a shielding cap mounting arrangement for electric outlet, which enables the shielding cap to be easily horizontally loaded in the electric outlet and moved horizontally between two positions to close/open the plugholes. It is another object of the present invention to provide a shielding cap mounting arrangement for electric outlet, which has means to indicate the positioning of the shielding cap. According to one aspect of the present invention, the electric outlet has a shell, a top recess in the shell, a set of plugholes in the top recess for receiving an electric plug, two rails at two sides of the top recess, two parallel sliding grooves respectively defined in the rails at two sides of the top recess, and two downward protruding portions downwardly protruded from the rails on the middle at an outer side; the shielding cap is mounted in the top recess between the downward protruding portions and moved along the sliding grooves to close/open the plugholes, having two side wings respectively horizontally inserted into the sliding grooves and suspended below the downward protruding portions to guide movement of the shielding cap in the top recess and to prohibit the shielding cap from escaping out of the top recess. According to another aspect of the present invention, the side wings of the shielding cap have respective front and rear sides disposed in flush with the distal ends of the side rails when the shielding cap moved to the open position to open the plugholes.

BRIEF DESCRIPTION OF THE DRAWINGS

FIG. 6A is a sectional view in an enlarged scale of a part of FIG. 4.

FIG. 6B is similar to FIG. 6A but showing the shielding cap partially inserted into the sliding grooves.

FIG. 10 is a sectional view taken along line 10—10 of FIG. 7.

DETAILED DESCRIPTION OF THE PREFERRED EMBODIMENT

Figure 1:
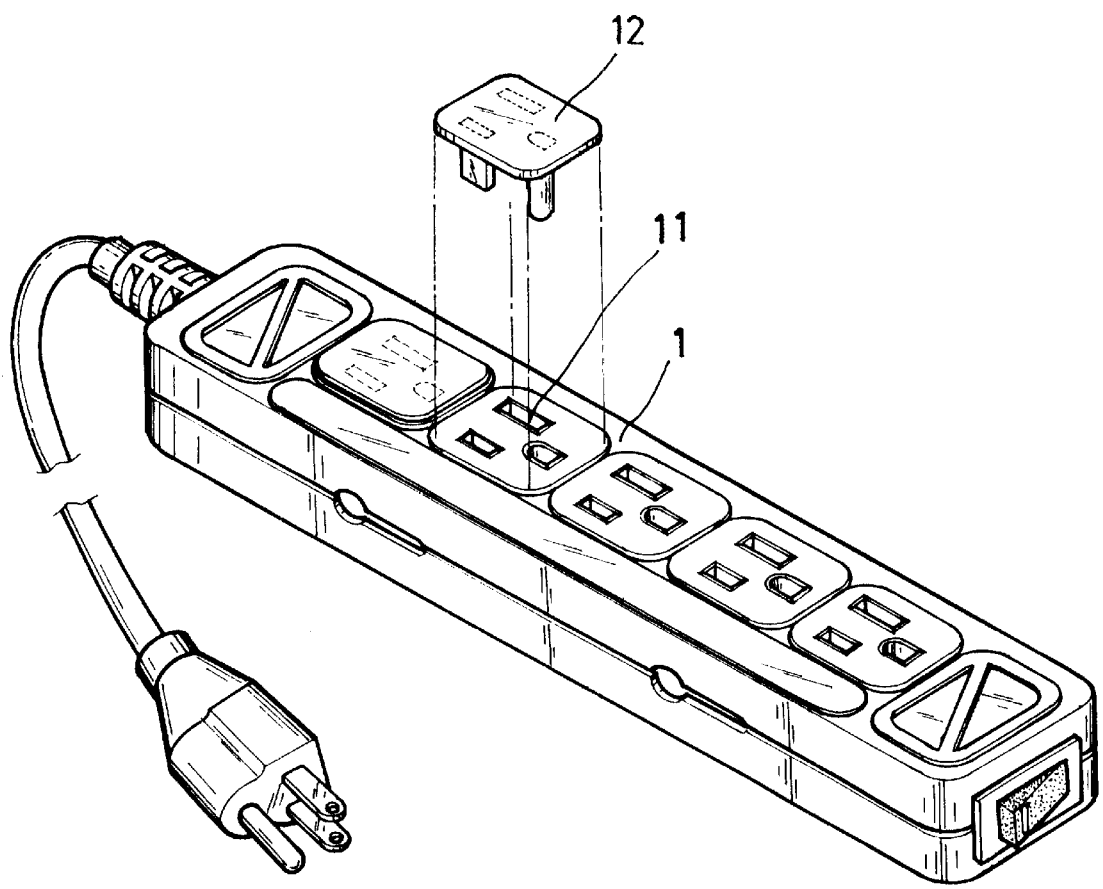
FIG. 1 is an exploded view of an electric outlet and shielding cap arrangement according to the prior art.
Figure 2A:
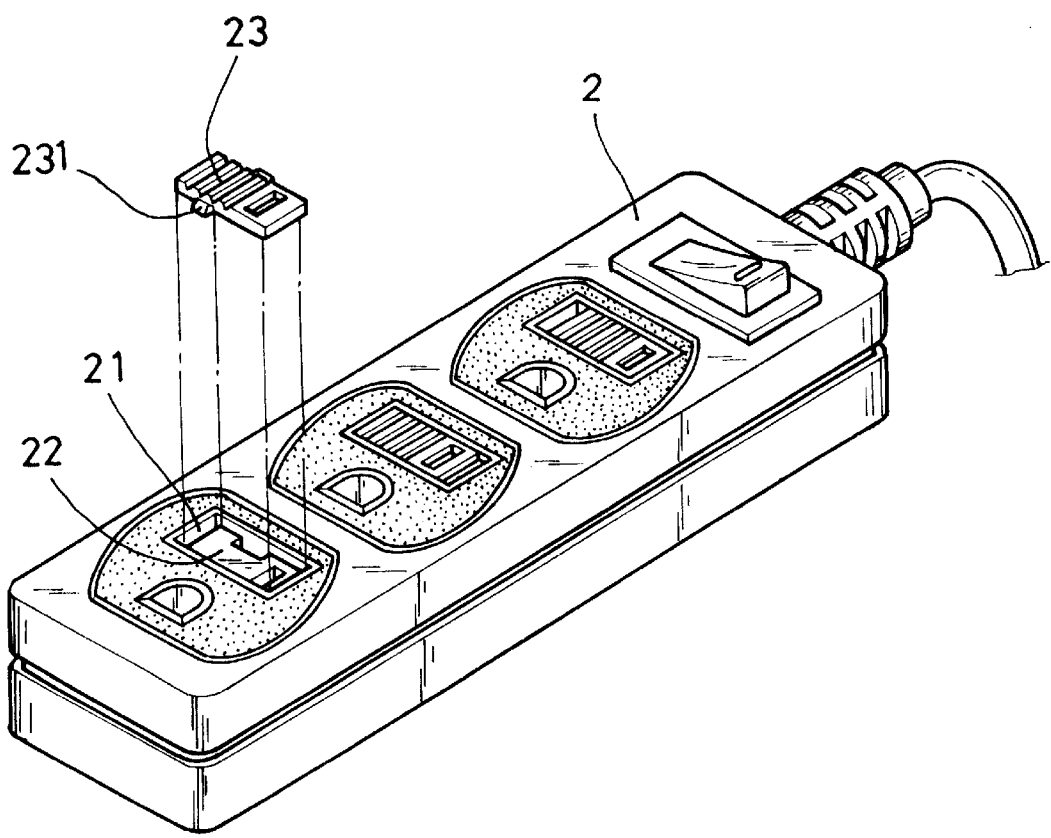
FIG. 2A is an exploded view of another design of electric outlet and shielding cap arrangement according to the prior art.
Figure 2B:
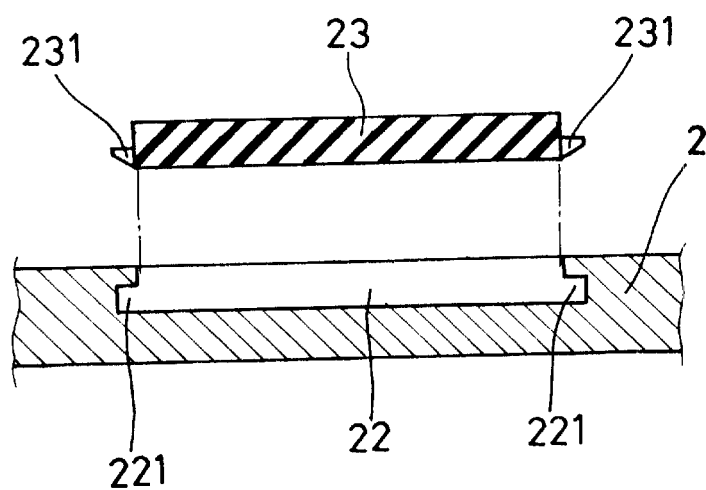
FIG. 2B is a sectional view in an enlarged scale of a part of FIG. 2A.
Figure 2C:
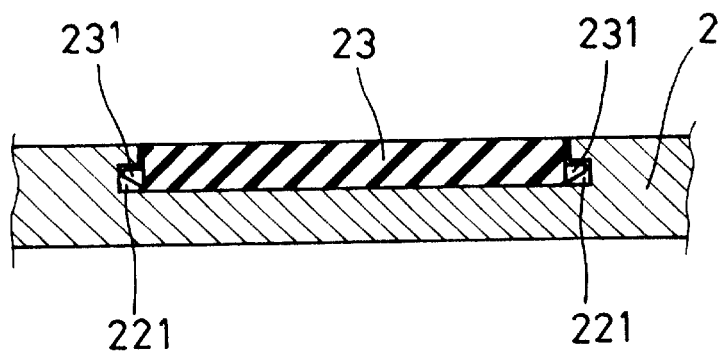
FIG. 2C is similar to FIG. 2B but showing the shielding cap installed in the top recess and coupled to the sliding grooves.
Figure 3A:
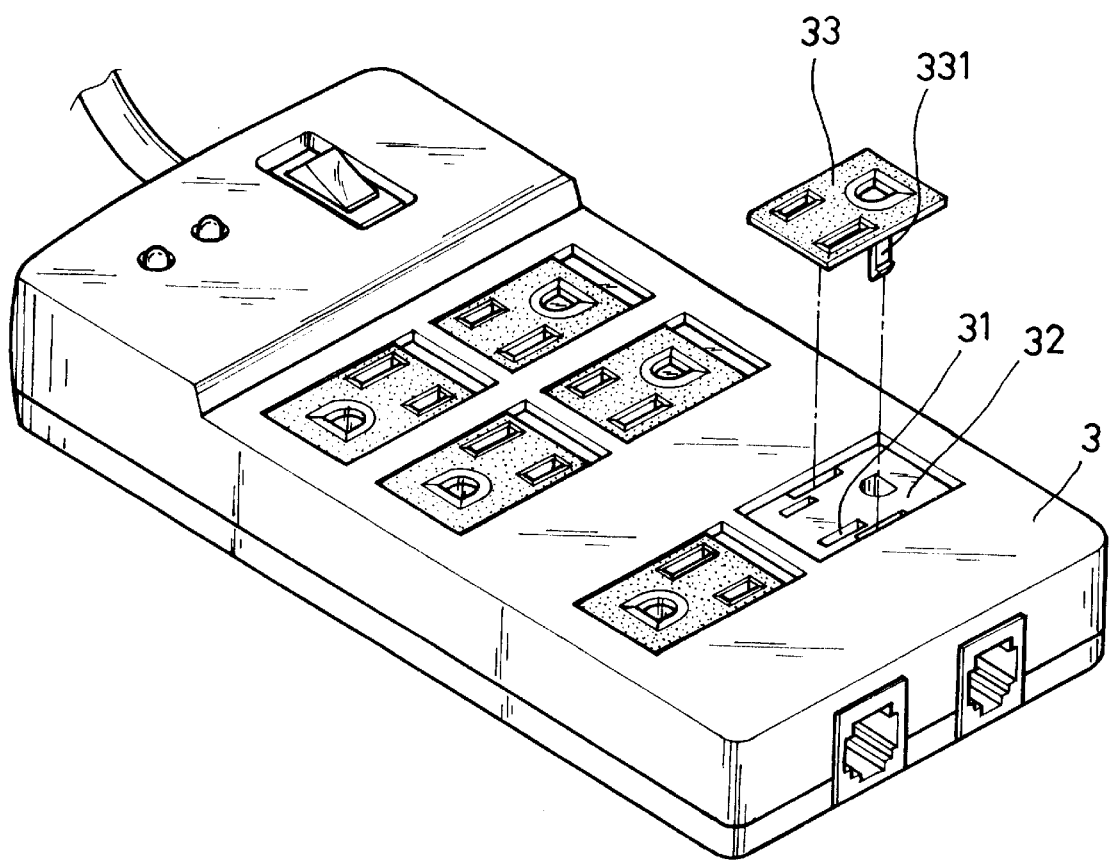
FIG. 3A is an exploded view of still another design of electric outlet and shielding cap arrangement according to the prior art.
Figure 3B:
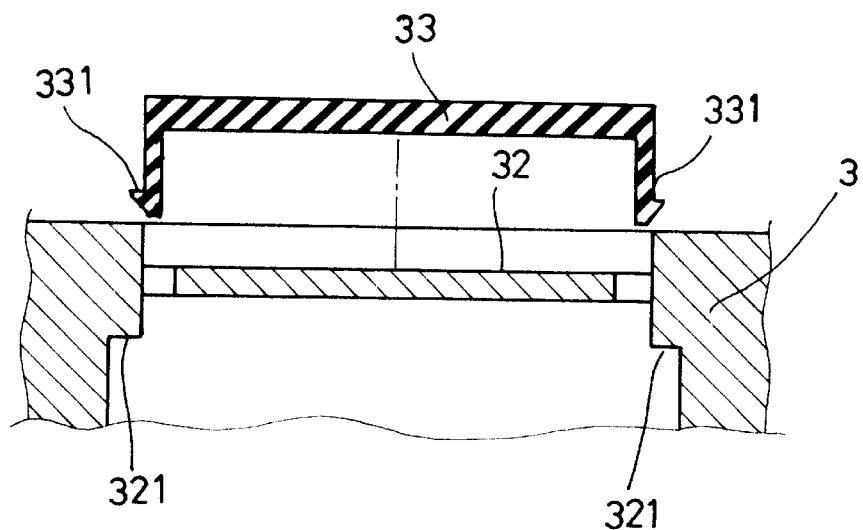
FIG. 3B is a sectional view in an enlarged scale of a part of FIG. 3A.
Figure 3C:
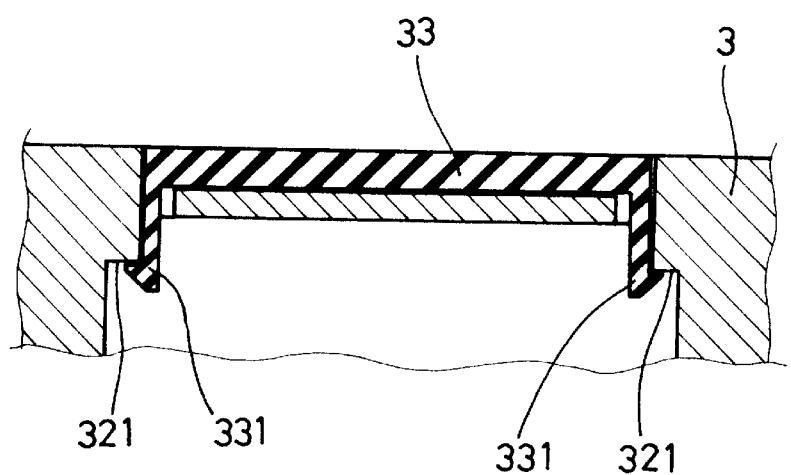
FIG. 3C is similar to FIG. 3B but showing the shielding cap installed in the top recess and coupled to the sliding grooves.
Figure 4:
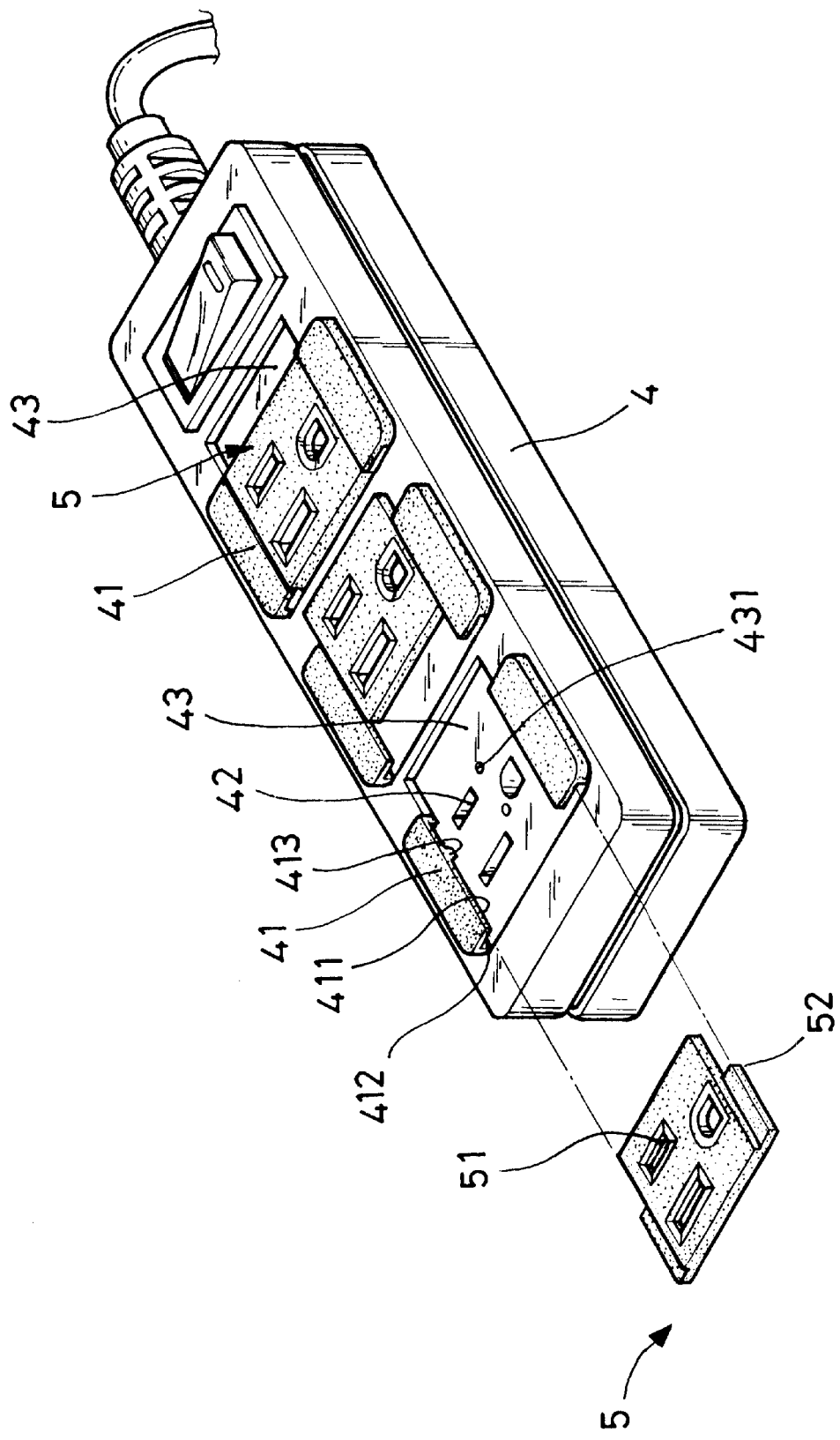
FIG. 4 is an exploded view of an electric outlet and shielding cap arrangement according to a first embodiment of the present invention.
Figure 5:
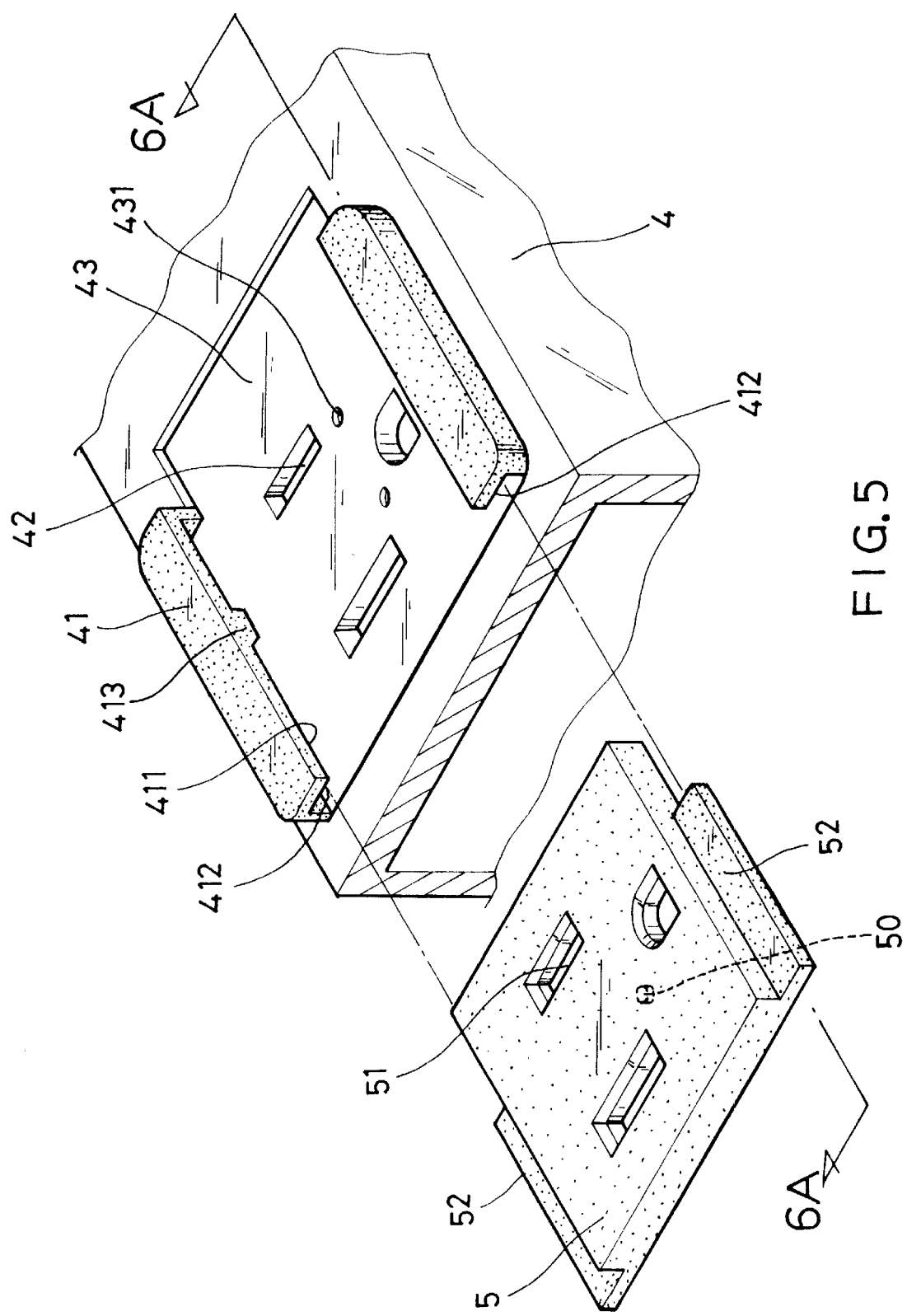
FIG. 5 is an enlarged view of a part of FIG. 4.
Figure 7:
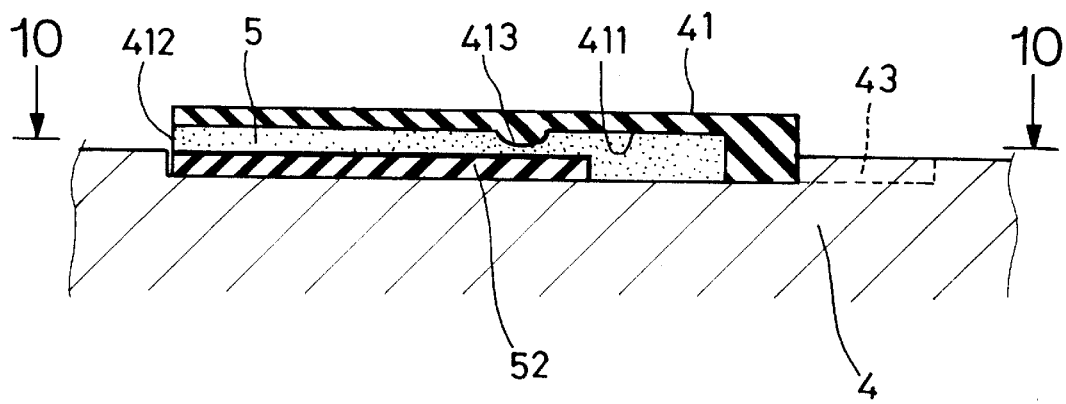
FIG. 7 is similar to FIG. 6A but showing the shielding cap inserted into the top recess.
Figure 8:
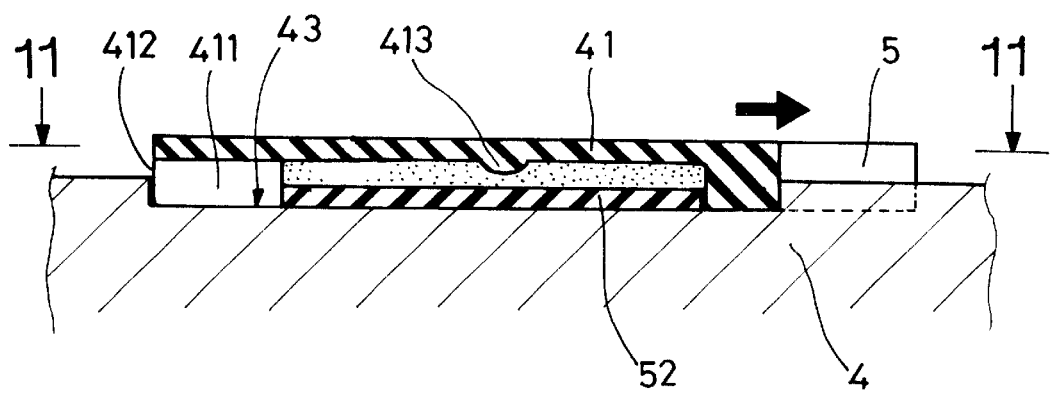
FIG. 8 is similar to FIG. 7 bus showing the shielding cap moved from the first position to the second position.
Figure 9:
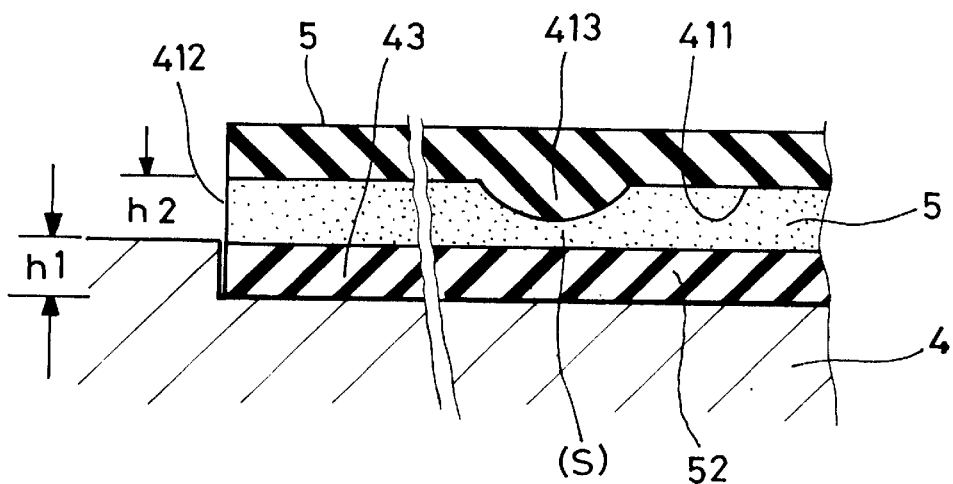
FIG. 9 is an enlarged view of a part of FIG. 8.

Referring to FIGS. from 4 through 9, a shielding cap mounting arrangement in accordance with a first embodiment of the present invention is shown comprised of an electric outlet 4, and a shielding cap 5 coupled to a top recess 43 in the shell of the electric outlet 4 and moved to close/open the corresponding set of plugholes 42 in the top recess 43. The electric outlet 4 has two rails 41 arranged in parallel at two sides of the top recess 43, and two recessed locating holes 431. The rails 41 each define a horizontal sliding groove 411. The horizontal sliding groove 411 has an open end 412. Further, each rail 41 has a downward protruding portion 413 disposed at an outer side. The shielding cap 5 fits the top recess 43, comprising a set of plugholes 51 corresponding to the plugholes 42 in the top recess 43 of the electric outlet 4, a raised portion 50 downwardly protruded from the bottom sidewall thereof, and two positioning side wings 52 outwardly extended from two opposite lateral sides thereof. The pitch between the downwardly protruded friction portions 413 of the rails 41 is approximately equal to the transverse width of the shielding cap 5.

Referring to FIGS. from 6 through 9 again, the shielding cap 5 is horizontally inserted into the space between the rails 41 to force the side wings 52 into the sliding grooves 411. After installation of the shielding cap 5 in the top recess 43, the shielding cap 5 is disposed in flush with the top of the rails 41, the side wings 52 are maintained in the sliding grooves 411 below the downward protruding portions 413 of the rails 41. After installation, the shielding cap 5 is moved along the sliding grooves 411 between a first (open) position where the raised portion 50 is forced into engagement with one recessed locating hole 431 and the plugholes 51 are respectively disposed in vertical alignment with the plugholes 42 for the installation of an electric plug, and a second (close) position where the raised portion 50 is forced into engagement with the other recessed locating hole 431 and the plugholes 51 are not in vertical alignment with the plugholes 42. Further, the side wings 52 have a certain length such that the top surfaces of the side wings are constantly maintained below the downward protruding portions 413 of the rails 41 when moving the shielding cap 5 between the first position and the second position. Therefore, the shielding cap 5 is prohibited from escaping out of the top recess 43. Further, the height h2 of the sliding grooves 411 allows the side wings 52 to pass but prohibits the shielding cap 5 to enter. After installation of the shielding cap 5 in the top recess 43, the gap S between the downward protruding portions 413 of the rails 41 is smaller than the height h1 of the top recess 43. Therefore, the shielding cap 5 is prohibited from escaping out of the sliding grooves 411 when inserted into the top recess 43.

Figure 11:
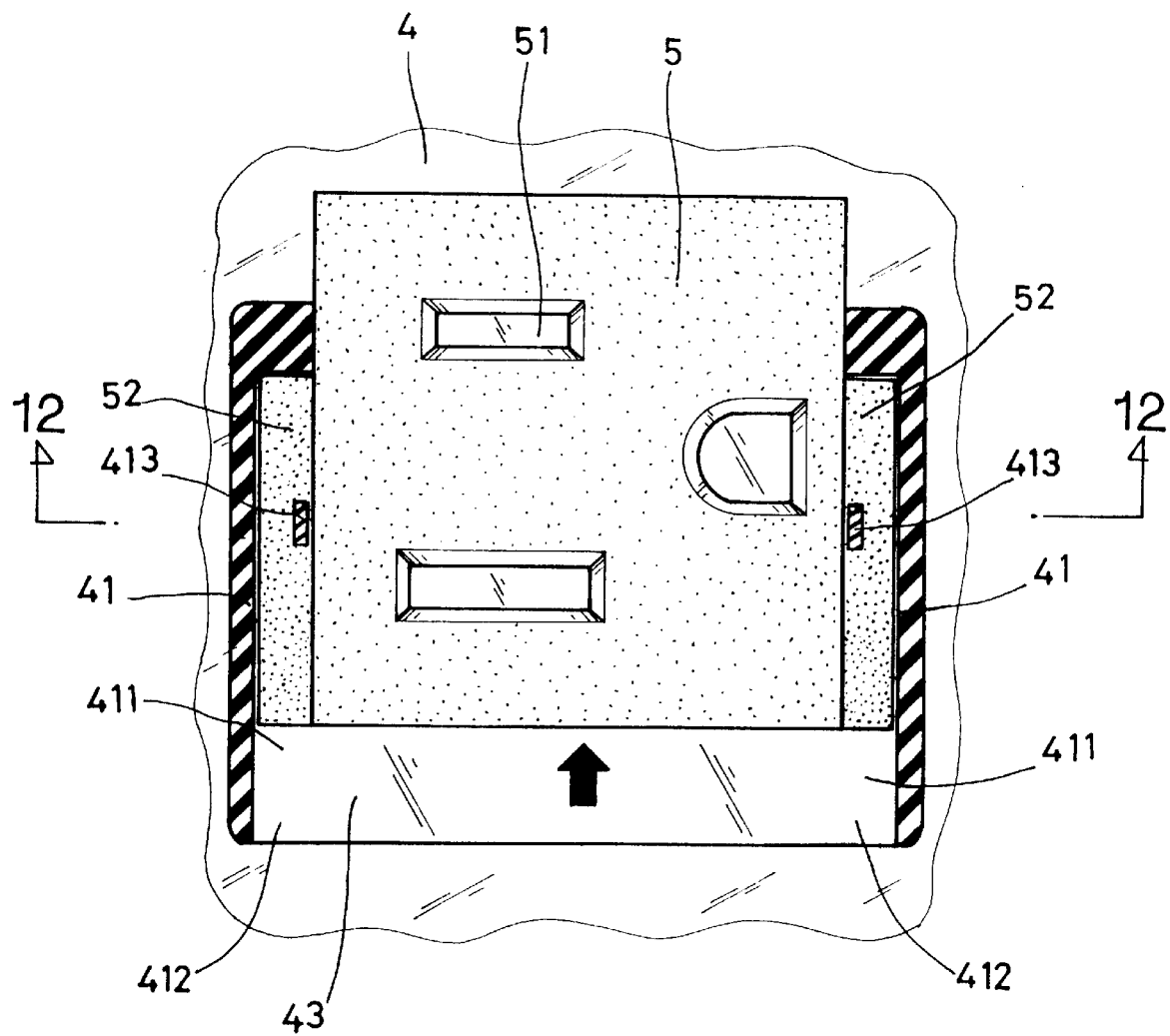
FIG. 11 is a sectional view taken along line 11—11 of FIG. 7.
Figure 12:
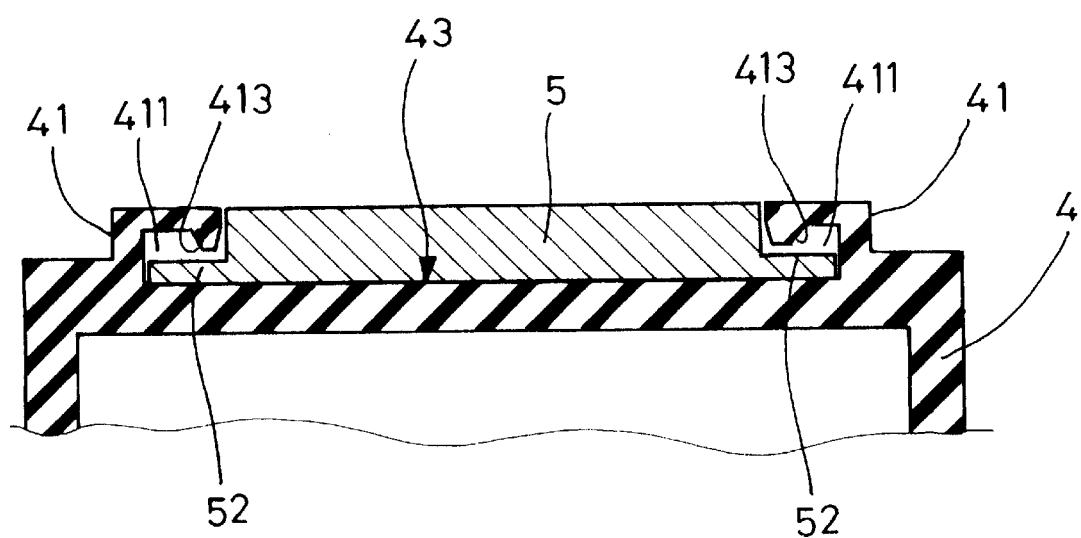
FIG. 12 is a sectional view taken along line 12—12 of FIG. 11.
Figure 13:
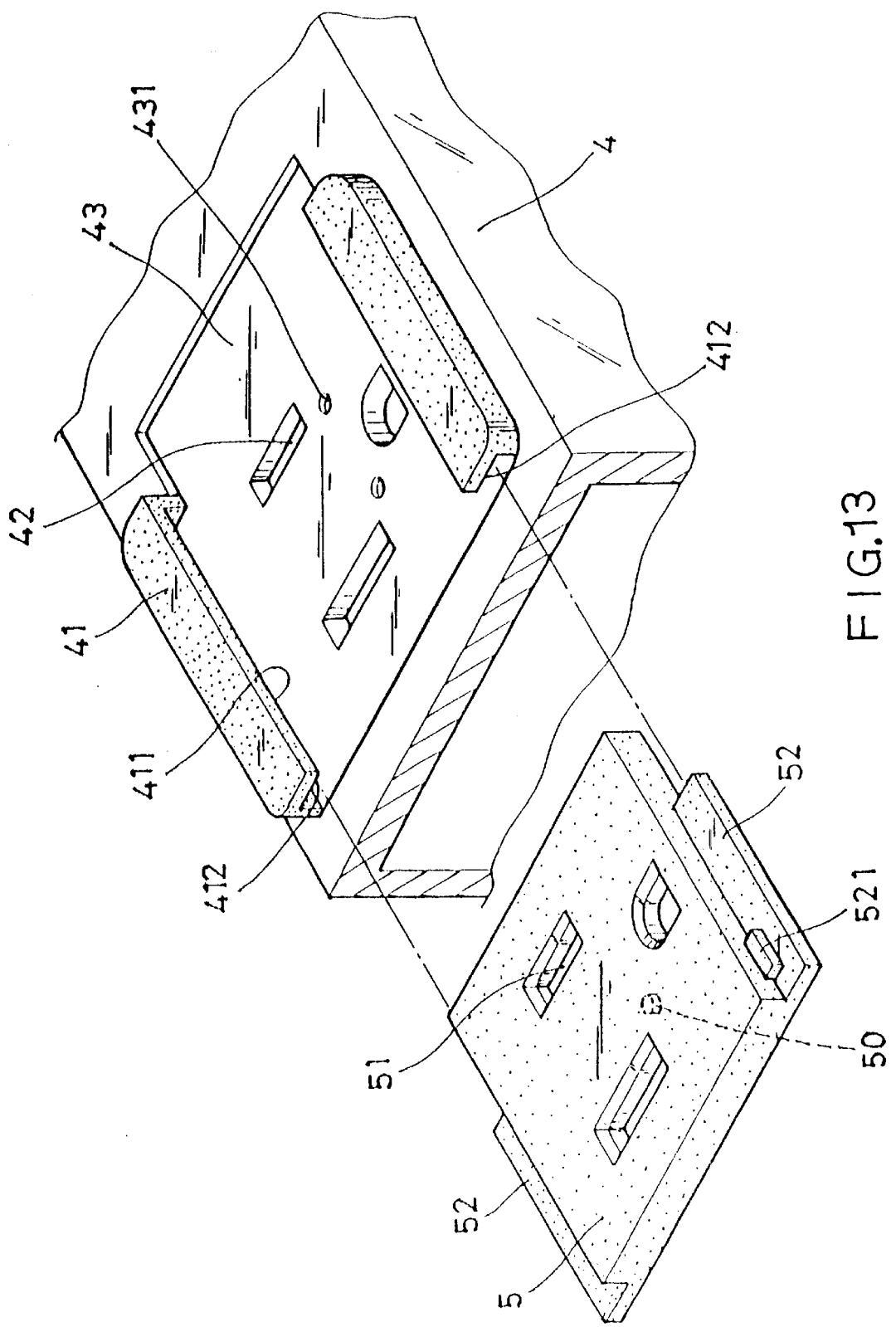
FIG. 13 is an exploded view of an electric outlet and shielding cap arrangement according to a second embodiment of the present invention.
Figure 14:
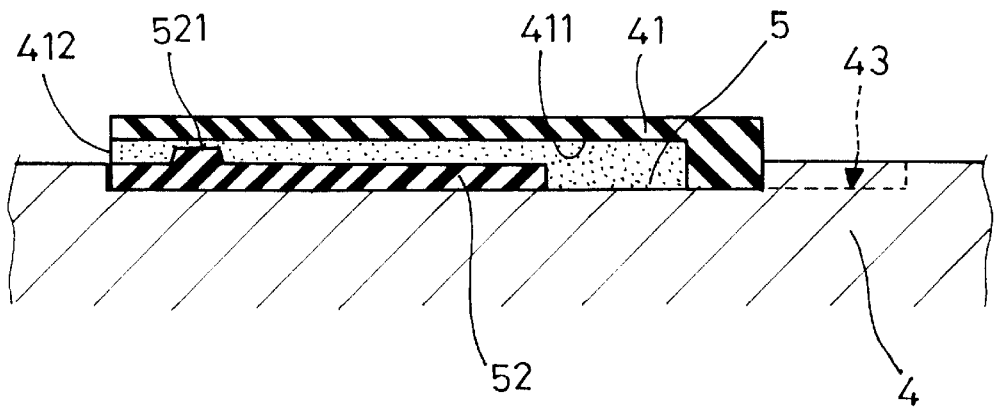
FIG. 14 is a sectional assembly view of the second embodiment of the present invention.
Figure 15:
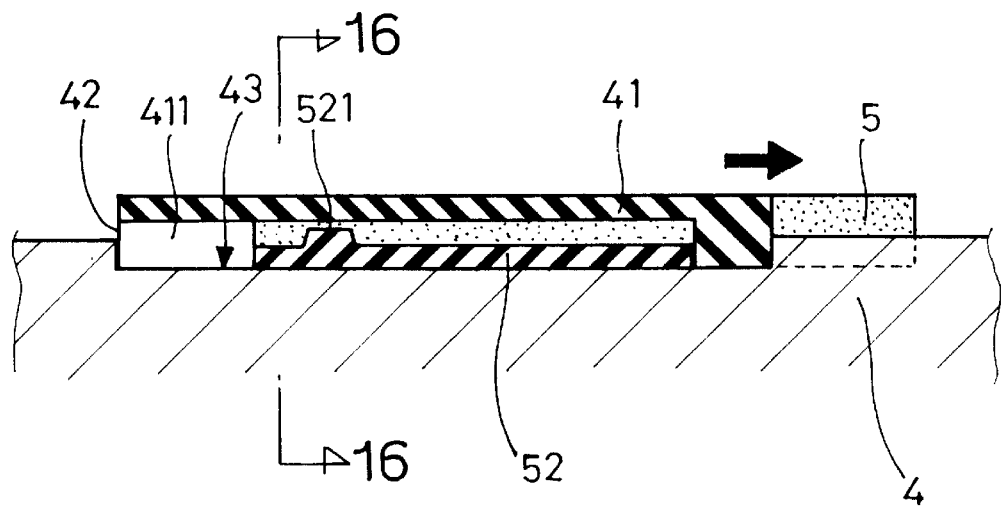
FIG. 15 is similar to FIG. 14 but showing the shielding cap moved from the first position to the second position.
Figure 16:
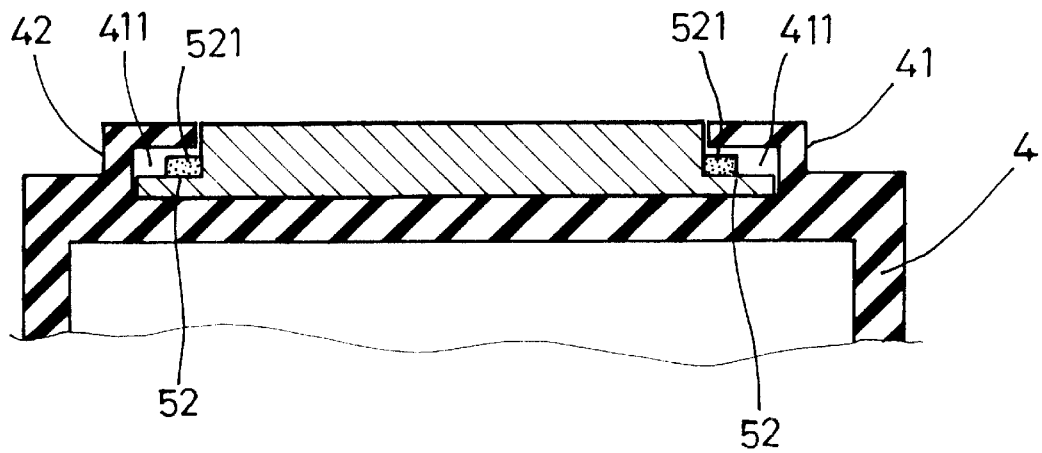
FIG. 16 is a sectional view taken along line 16—16 of FIG. 15.

Referring to FIGS. 10 and 11, the shielding cap 5 is constantly maintained below the downward protruding portions 413 of the rails 41. When the electric outlet fell to the ground from a high place, the shielding cap 5 is maintained coupled to the top recess 43 of the electric outlet 4. Further, because the shielding cap 5 has about one half of its thickness protruded over the top recess 43, the user can conveniently smoothly move the shielding cap 5 in the sliding grooves 411 back and forth with the fingers between the first position and the second position to close/open the plugholes 42. When the shielding cap 5 shifted to the first position to open the plugholes 42, the front and rear sides of the shielding cap 5 are respectively disposed in flush with the front and rear sides of the rails 41. Therefore, the user can easily check the position of the shielding cap 5.

FIGS. 13~16 show a shielding cap mounting arrangement in accordance with a second embodiment of the present invention. According to this embodiment, the aforesaid downward protruding portions 413 are eliminated from the rails 41; the side wings 52 each have a top locating block 521 near one end. When inserting the shielding cap 5 into the top recess 43 between the rails 41, the side wings 52 are forced into the sliding grooves 411. The combined height of the top locating block 521 and the corresponding side wing 52 is greater than the height of the open end 412, a push force must be applied to the shielding cap 5 to deform the rails 41 slightly, enabling the top locating blocks 521 to be moved with the side wings 52 into the sliding grooves 411. After installation, the top locating blocks 521 and the side wings 52 prohibit the shielding cap 5 from being moved out of the open ends 412 of the sliding grooves 41.

Figure 17:
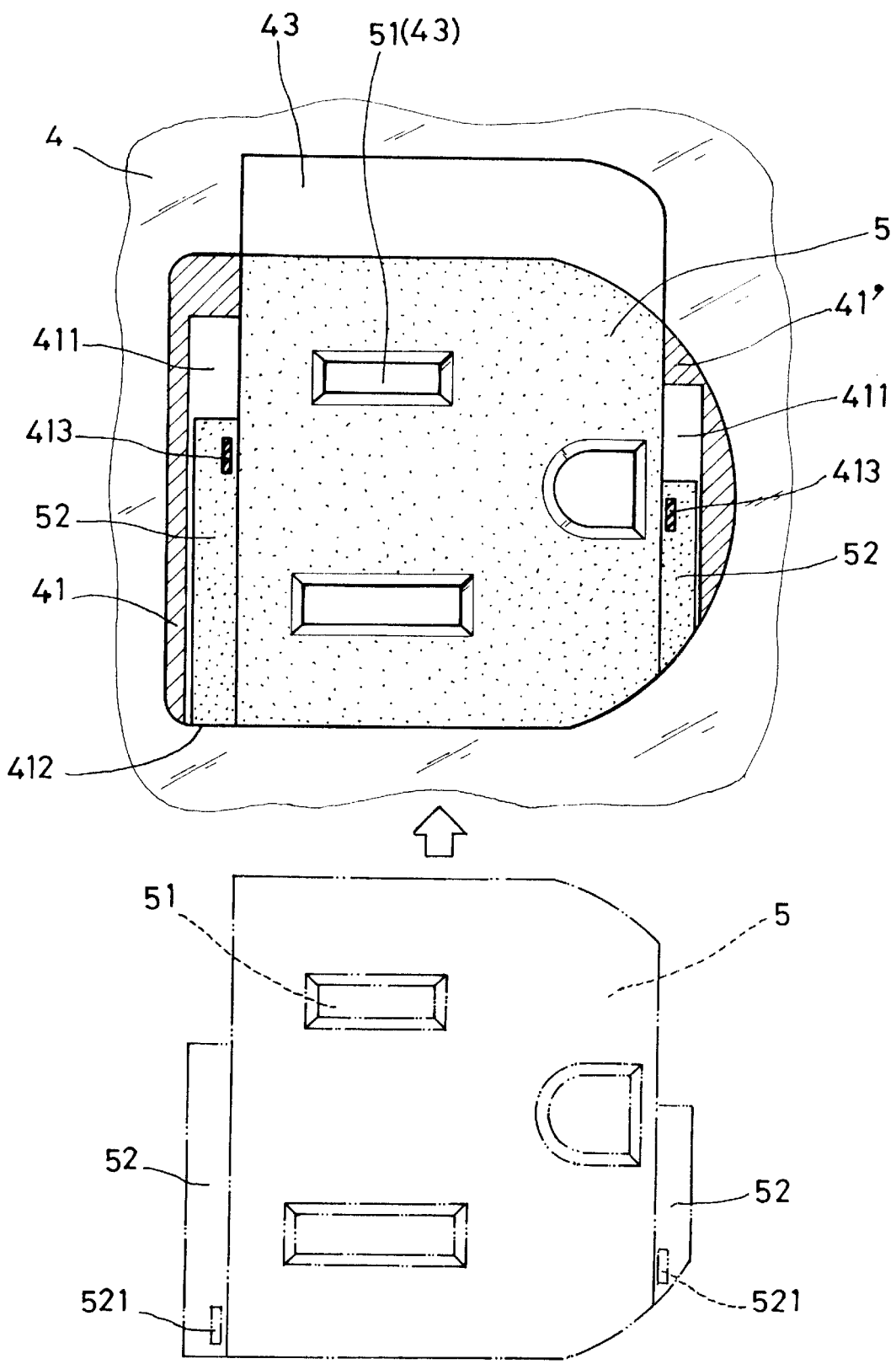
FIG. 17 illustrates an electric outlet and shielding cap arrangement according to a third embodiment of the present invention.
Figure 18:
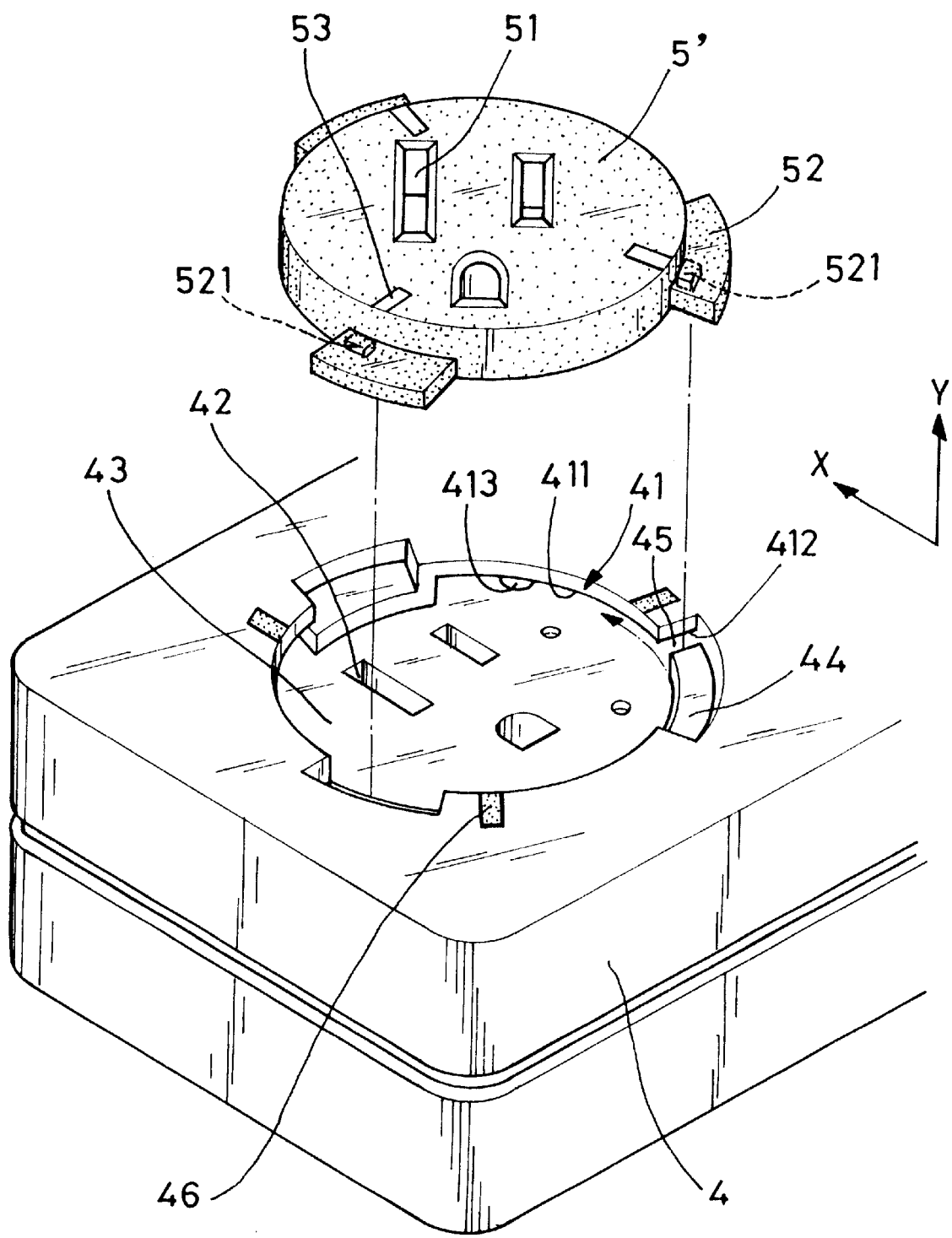
FIG. 18 is an exploded view of an electric outlet and shielding cap arrangement according to a fourth embodiment of the present invention.

FIG. 17 shows a shielding cap mounting arrangement in accordance with a third embodiment of the present invention. This embodiment is similar to the aforesaid first and second embodiments with the exception of the shape of the rails 41 and the length of the side wings 52. According to this embodiment, one rail 41' has a one side smoothly arched; the side wings 52 have different lengths.

FIGS. 18~22 show a shielding cap mounting arrangement in accordance with a fourth embodiment of the present invention. This embodiment provides same features as stated in the aforesaid first, second, and third embodiments with the exception of the circular to fit a circular plug. This embodiment comprises an electric outlet 4, the electric outlet 4 comprising a top frame 41, a circular top recess 43 in the top frame 41, a plurality of sliding grooves 411 spaced around the circular top recess 43, and a set of plugholes 42 in the top recess 43, and a circular shielding cap 5' coupled to a top recess 43 of the electric outlet 4 and moved to close/open the plugholes 42. The shielding cap 5' comprises a set of plugholes 51 corresponding to the plugholes 42 in the top recess 43, and peripheral wings 52 respectively coupled to the sliding grooves 411 for enabling the shielding cap 5' to be rotated within the top recess 43 to close/open the plugholes 42. The main features of this embodiment are outlined hereinafter. The top frame 41 comprises a plurality of openings 44 spaced around the top recess 43 and respectively disposed in communication with the open ends 412 of the sliding grooves 411, steps 45 respectively disposed between the open ends 412 of the sliding grooves 411 and the openings 44, and downward protruding portions 413 respectively disposed on the middle of the sliding grooves 411 at an outer side. The peripheral wings 52 of the shielding cap 5' fit the openings 44 of the top frame 41, each having a top locating block 521.

Figure 19:
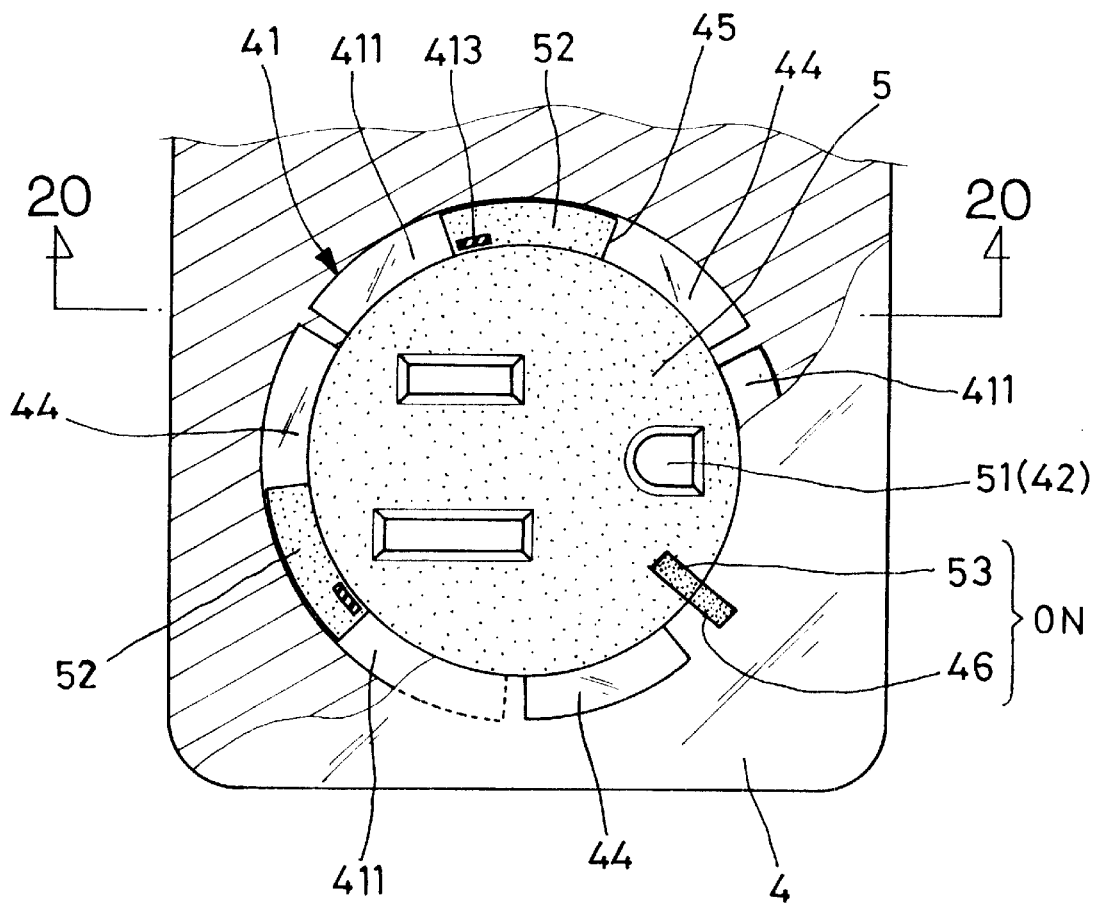
FIG. 19 is a top view of the fourth embodiment of the present invention showing the plugholes opened.
Figure 20:
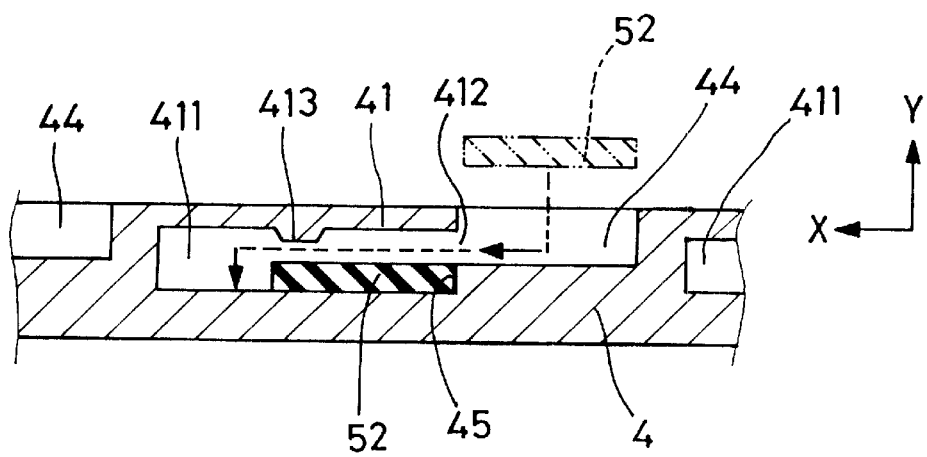
FIG. 20 is a sectional view taken along line 20—20 of FIG. 19.
Figure 21:
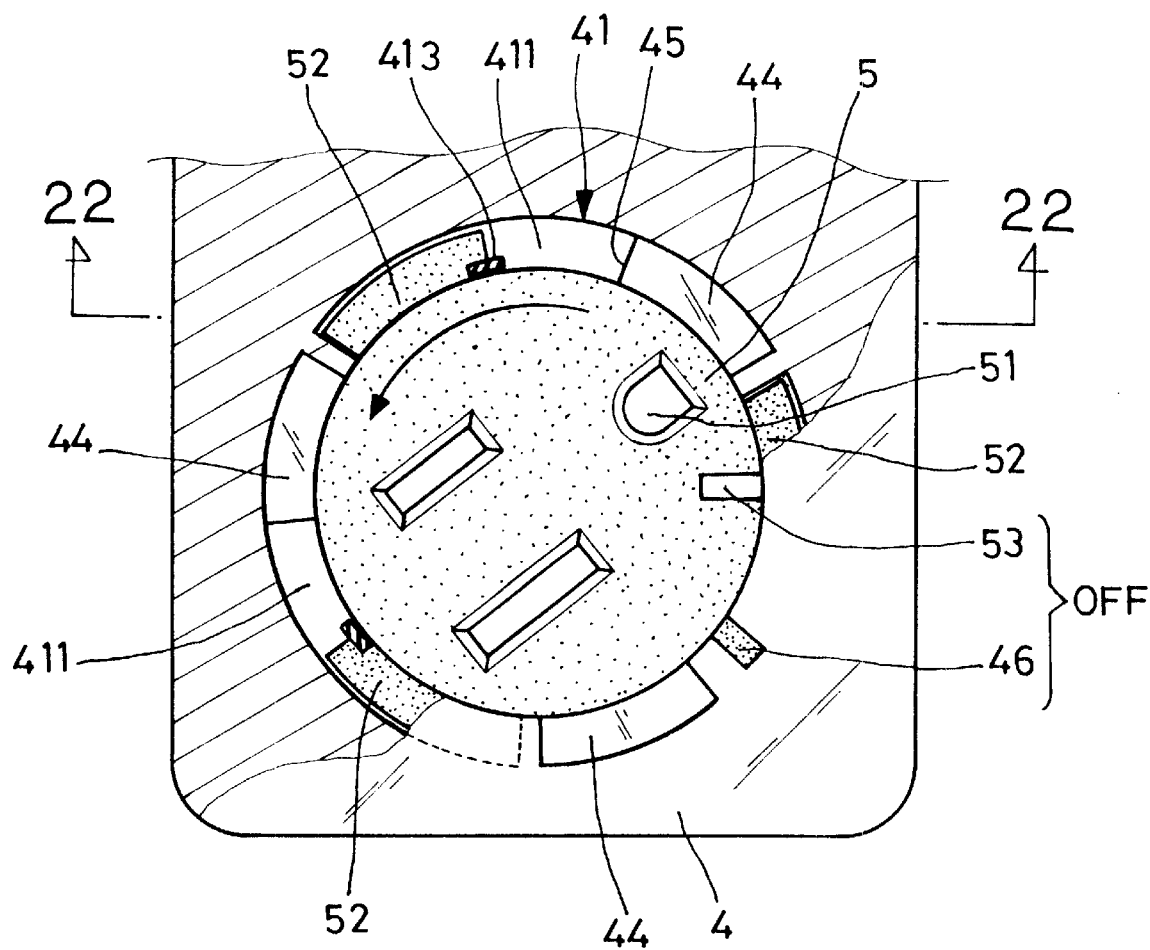
FIG. 21 is a top view of the fourth embodiment of the present invention showing the plugholes closed.
Figure 22:
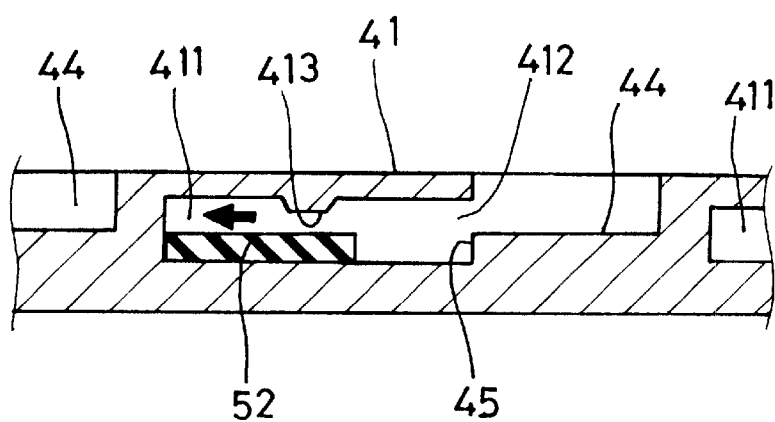
FIG. 22 is a sectional view taken along line 22—22 of FIG. 21.

During installation, the peripheral wings 52 are inserted with the shielding cap 5' into the openings 44, and then the shielding cap 5' is rotated in one direction to force the peripheral wings 52 and the top locating blocks 521 into the sliding grooves 44. After installation, the downward protruding portions 413 and the stops 45 stop the peripheral wings 52 in the sliding grooves 411, enabling the shielding cap 5' to be rotated within a limited angle to close/open the plugholes 42. FIGS. 19 and 20 show the shielding cap 5' moved to the ON position, i.e., the plugholes 51 are respectively vertically aligned with the plugholes 42 for receiving an electric plug. At this time, the marks 46 at the top frame 41 and the marks 53 at the shielding cap 5' are respectively aligned. FIGS. 21 and 22 show the shielding cap 5' moved to the OFF position, i.e., the plugholes 42 are kept from sight, and the marks 53 at the shielding cap 5' are deviated from the marks 46 at the top frame 4. According to this embodiment, the top frame 41 is formed integral with the outer shell of the electric outlet 4, keeping the top surface in a smooth manner.

A prototype of shielding cap mounting arrangement for electric outlet has been constructed with the features of the annexed drawings of FIGS. 4~22. The shielding cap mounting arrangement for electric outlet functions smoothly to provide all of the features discussed earlier.

Although particular embodiments of the invention has been described in detail for purposes of illustration, various modifications and enhancements may be made without departing from the spirit and scope of the invention. Accordingly, the invention is not to be limited except as by the appended claims.

What the invention claimed is:

1. A shielding cap mounting arrangement comprising:
   an electric outlet, said electric outlet comprising a shell, a top recess in said shell, a set of plugholes in said top recess, two rails at two sides of said top recess, and two parallel sliding grooves respectively defined in said rails at two sides of said top recess; and
   a shielding cap mounted in said top recess and moved along said sliding grooves to close/open said plugholes;
   wherein said sliding grooves each have an open end through which said shielding cap is inserted into said top recess; said shielding cap comprises two side wings respectively horizontally inserted through the open ends of said sliding grooves into said sliding grooves for enabling said shielding cap to be moved in said top recess along said sliding grooves to close/open said plugholes; said rails each have a downward protruding portion respectively, the downward protruding portion stops at one side of said shielding cap above said side wings and stops said shielding cap from escaping out of said sliding grooves.

2. The shielding cap mounting arrangement as claimed in claim 1 wherein said rails are respectively upwardly protruded from the shell of said electric outlet at two sides of said top recess, and said shielding cap is disposed in flush with said rails after insertion into said top recess.

* * * * *